United States Patent [19]
Kuroyanagi

[11] 3,974,520
[45] Aug. 10, 1976

[54] CHROMINANCE SUBCARRIER PHASE CONTROL SYSTEM

[75] Inventor: Kunihiro Kuroyanagi, Chigasaki, Japan

[73] Assignee: Sony Corporation, Tokyo, Japan

[22] Filed: Apr. 22, 1975

[21] Appl. No.: 571,002

[30] Foreign Application Priority Data
Apr. 23, 1974 Japan.................................. 49-45735

[52] U.S. Cl. .............................. 358/17; 178/69.5; 178/69.5 CB; 358/8
[51] Int. Cl.² .......................................... H04N 9/44
[58] Field of Search ................ 178/69.5 CB; 358/8, 358/17

Primary Examiner—Robert L. Richardson
Attorney, Agent, or Firm—Lewis H. Eslinger; Alvin Sinderbrand

[57] ABSTRACT

In a color video signal processing system having an automatic phase control circuit for correcting effects of angular errors, that is, time axis variations, in the chrominance subcarrier, the loop gain of the automatic phase control circuit is increased for each vertical blanking interval, as compared with the loop gain during each vertical trace of scanning interval of the color video signal, so as to eliminate visible hue aberrations from the color television picture that results from the processed color video signal. Variations in the frequency and/or phase of the chrominance subcarrier are desirably eliminated in a frequency converter by means of a frequency converting signal provided by the automatic phase control circuit which includes a variable frequency oscillator under the control of a control or error voltage from a phase comparator comparing the chrominance subcarrier with the output of a stable local oscillator, and the change in the loop gain of such automatic phase control circuit is effected by selectively attenuating the output of the stable local oscillator supplied to the phase comparator, or by selectively controlling a bias voltage of the variable frequency oscillator.

9 Claims, 6 Drawing Figures

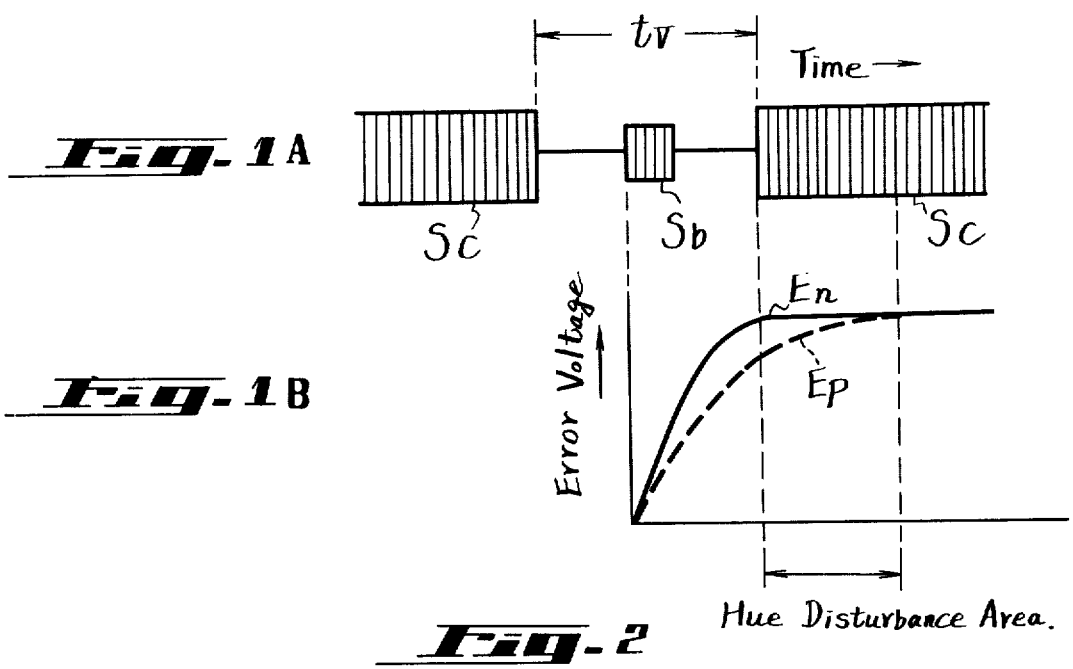
Fig. 1A
Fig. 1B
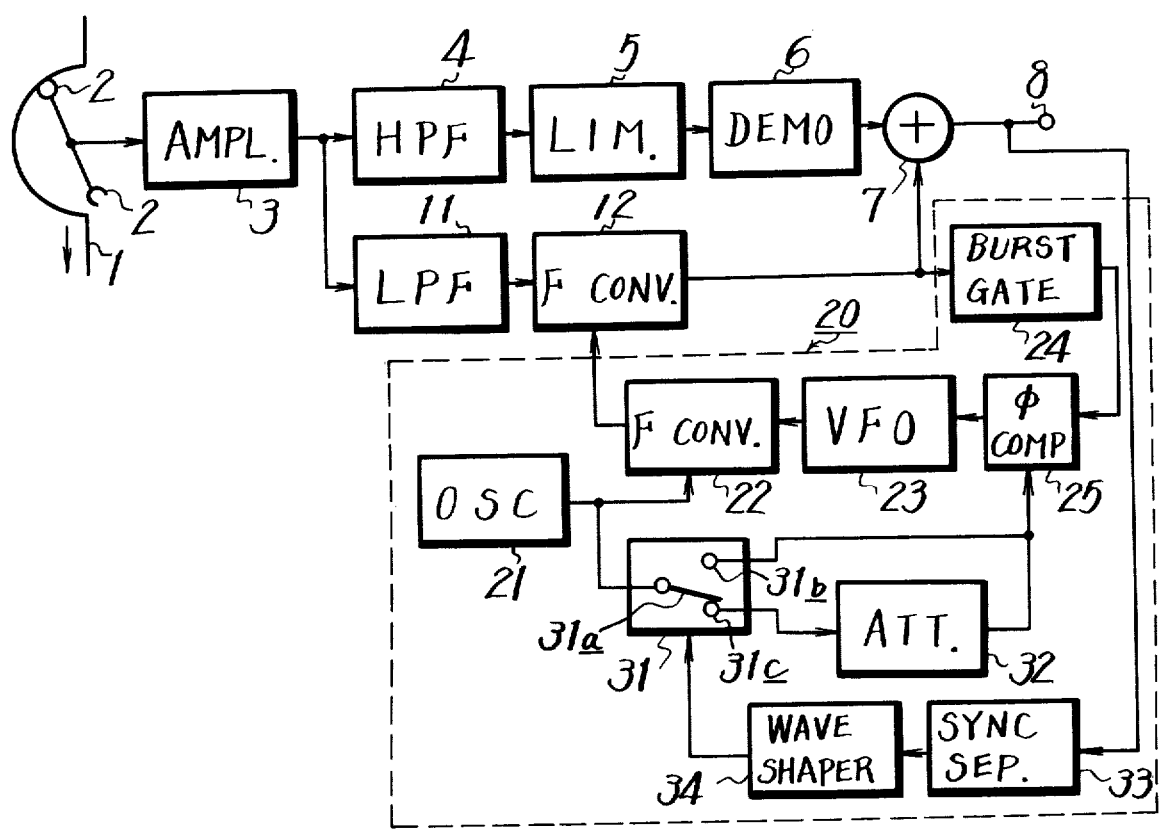
Fig. 2

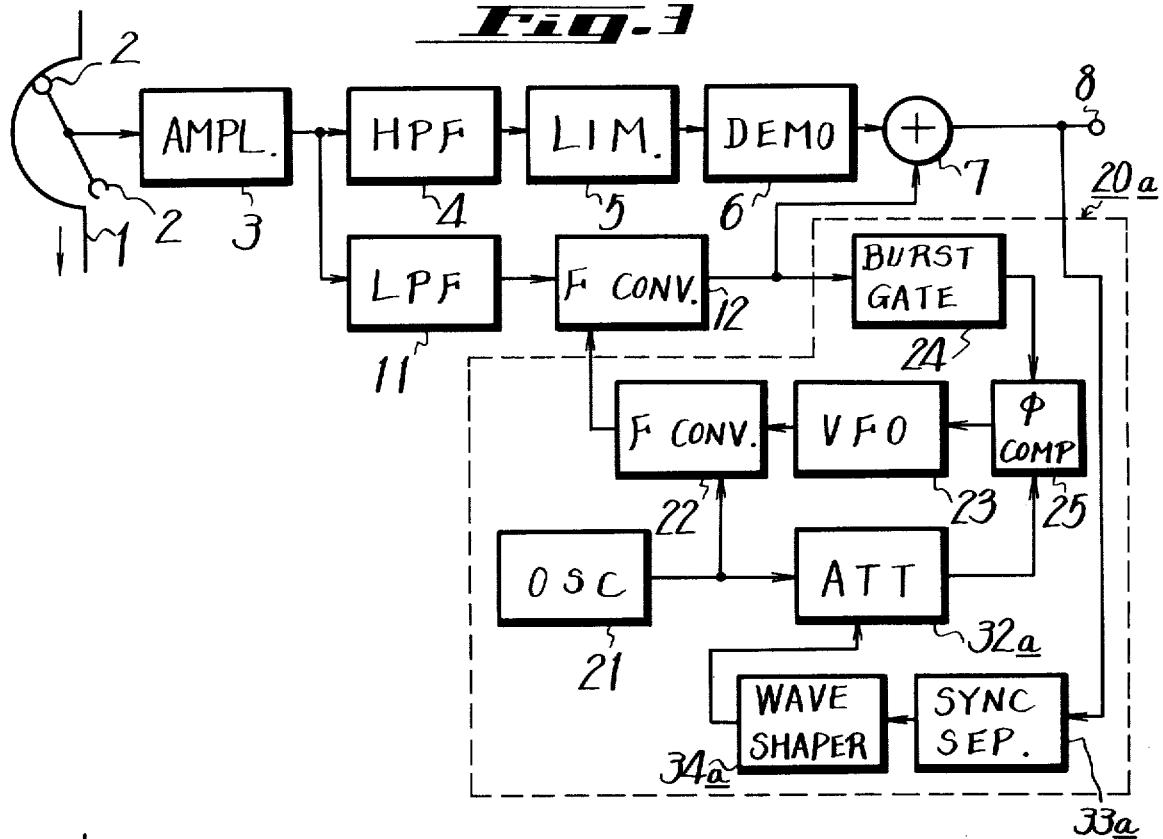
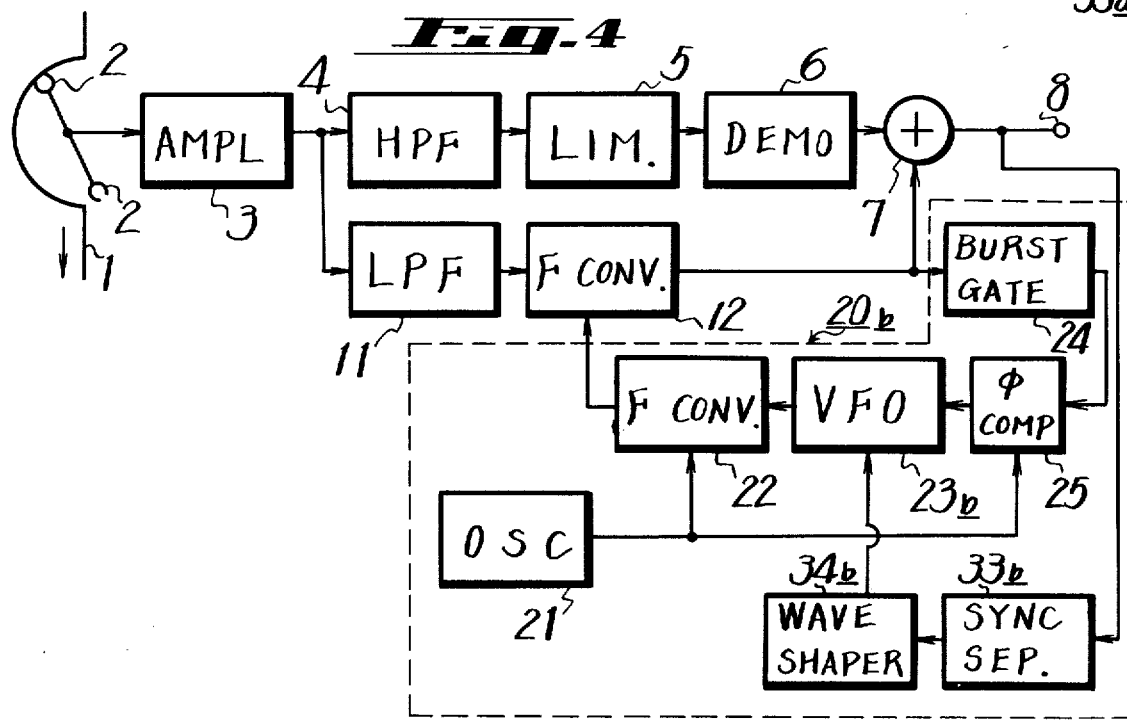

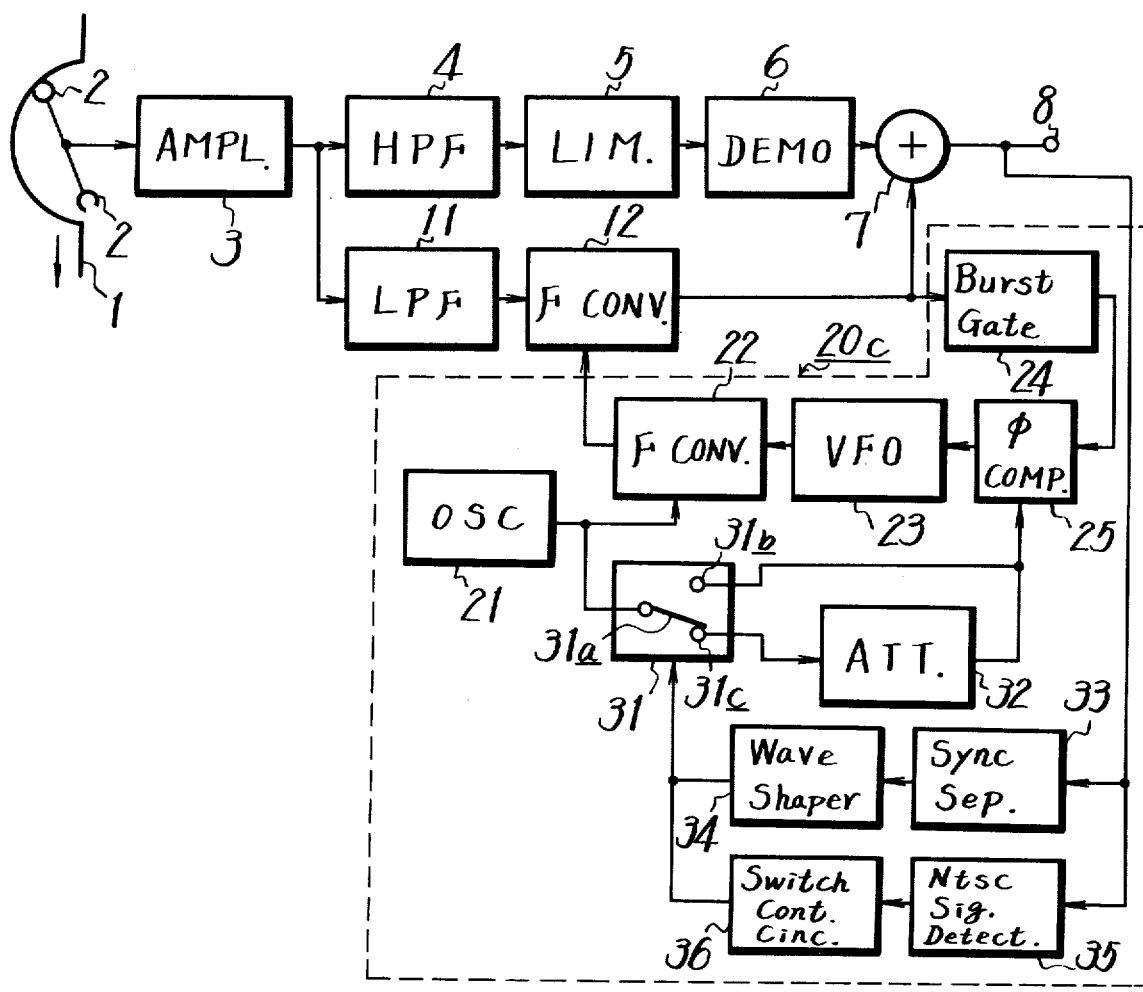

CHROMINANCE SUBCARRIER PHASE CONTROL SYSTEM

BACKGROUND OF THE INVENTION

1. Field of the Invention

This invention relates generally to a color video signal processing system, and more particularly is directed to apparatus for correcting effects of angular errors in the chrominance subcarrier of a color video signal.

2. Description of the Prior Art

In apparatus for the magnetic recording and reproducing of color video signals, frequently referred to as a color VTR, an automatic phase control (APC) circuit or a phase-locked servo loop (PLL) is provided in order to eliminate variations in the frequency or phase of the subcarrier of the chrominance component of a color video signal reproduced from a magnetic tape. In such apparatus provided with an APC circuit or PLL, a burst signal is extracted from the reproduced chrominance component and is applied to a phase comparator where it is compared with a stable reference signal, for example, from a local oscillator, with the output or error voltage issuing from the comparator as a result of such comparison being employed for controlling the frequency and/or phase of the chrominance subcarrier.

When an APC circuit is employed, if the phase deviation or variation of the subcarrier frequency of the reproduced chrominance component is too great, the APC circuit cannot correct the subcarrier frequency to the desired value. However, if the phase variation of the subcarrier is within a predetermined range, the deviated subcarrier frequency can be captured or pulled in to the correct value. The frequency range within which the deviated subcarrier frequency can be pulled in to the correct value is referred to as the "pull-in range in APC. " After the subcarrier frequency has been once pulled in to the correct frequency, the frequency range within which it is possible to again correct the deviated frequency of the subcarrier is referred to as the "hold range in APC. " If the color video signal is in accordance with the NTSC system, and thus has a horizontal frequency of 15.734 KHz, the hold range may extend over ± 15.734 KHz, while the pull-in range may extend over one-half of the hold range that is, over ± 7.9 KHz. However, if the color video signal is in accordance with the PAL system, in which the phase of the burst signal is changed by 90° in successive horizontal periods, it will be apparent that the frequency of the periods in which the burst signals are of the same phase is one-half the horizontal or line frequency. Thus, in the case of a color video signal according to the PAL system, the pull-in range and hold range are approximately one-half the corresponding ranges in the case of a color video signal according to the NTSC system. Therefore, since the horizontal frequency in the PAL system is 15.625 KHz, the hold range for a color video signal of such system may extend over ± 7.8 KHz while the pull-in range therefor may extend over ± 3.9 KHz.

As a result of the foregoing, if a color VTR is provided to selectively record and reproduce either NTSC or PAL color video signals, for example, as disclosed in detail in U.S. Pat. No. 3,854,237, issued Oct. 29, 1974, and having a common assignee herewith, and hold and pull-in ranges are made to be the same for reproducing both types of color video signals, the subcarrier frequency of the chrominance component may be mislocked to an erroneous frequency when reproducing the PAL color video signals. In order to avoid the foregoing problem in a color VTR for recording and reproducing both PAL and NTSC color video signals, the hold and pull-in ranges, when reproducing PAL color video signals, have to be selected to be about one-half the values of the respective ranges when reproducing NTSC color video signals. To this end, it has been proposed in the prior art, when a PAL color video signal is being reproduced, the loop gain of the above mentioned APC circuit should be reduced about 6 dB, that is, to approximately one-half the loop gain of the APC circuit when reproducing an NTSC color video signal.

However, when the reduced loop gain of the APC circuit is employed during reproducing of a PAL color video signal, as proposed in the prior art, an undesirable phenomenon may occur. More specifically, due to the reduced loop gain of the APC circuit, when the phase comparator detects a deviation of the burst signal from the reference signal, the output or error voltage issuing from the comparator will exhibit a relatively slow rising rate with the result that the correction of the frequency and/or phase of the chrominance subcarrier may not be completed during the blanking interval and may carry over into the beginning of the subsequent vertical trace or scanning period. By reason of the foregoing, hue abbreviations may appear at the upper portion of the color television picture produced from the reproduced PAL color video signal. Moreover, the described problem arises in any color VTR which employs an APC with a relatively small or reduced loop gain for reproducing PAL color video signals, that is, in a color VTR intended only for use with PAL color video signals, as well as in a color. VTR intended for use with both NTSC and PAL color video signals.

OBJECTS AND SUMMARY OF THE INVENTION

Accordingly, it is an object of this invention to provide a color video signal processing system for correcting effects of angular errors, that is, time axis variations, in the chrominance subcarrier, and which avoids the above described problems in the prior art.

More specifically, it is an object of this invention to provide a color video signal processing system having an APC circuit for correcting phase and/or frequency errors in the chrominance subcarrier, and in which the loop gain of the APC circuit is made relatively high, at least during each vertical blanking interval, even when processing PAL color video signals so as to prevent hue aberrations from appearing at the upper portion of a color television picture reproduced from such color video signals.

A further object is to provide a color video signal processing system, for example, in the reproducing section of a color VTR, and which is adapted to process either PAL or NTSC color video signals so as to correct phase and/or frequency errors in the chrominance subcarrier of the reproduced signal.

In accordance with an aspect of this invention, in a color video signal processing system having an automatic phase control circuit for correcting effects of angular errors in the chrominance subcarrier of a color video signal, the loop gain of the automatic phase control circuit is increased for each vertical blanking interval of a PAL color video signal as compared with the loop gain during each vertical trace or scanning interval of such signal so as to obtain the accurate correction of the chrominance subcarrier without introducing the hue aberrations that would appear at the upper portion of the color television picture produced from the processed PAL color video signal if the loop gain was continuously maintained at the relatively lower level for obtaining the pull-in and hold ranges required for PAL signals.

When the color video signal processing system according to this invention is employed in a color VTR for recording and reproducing both NTSC and PAL color video signals, the loop gain of the APC circuit is continuously maintained at its high level during reproducing of NTSC color video signals, and the changing of the loop gain, as aforesaid, is effected only during the reproducing of PAL color video signals.

In preferred embodiments of the invention, variations in the frequency and/or phase of the chrominance subcarrier in a reproduced color video signal are eliminated in a frequency converter by means of a frequency converting signal applied thereto by the APC circuit which includes a variable frequency oscillator under the control of a control or error voltage from a phase comparator which compares the chrominance subcarrier with the output of a stable local oscillator or reference signal source, and, during the processing of a PAL color video signal, the change in the loop gain of the APC circuit is effected by selectively attenuating the output of the stable local oscillator supplied to the phase comparator, or by selectively controlling a bias voltage of the variable frequency oscillator.

The above, and other objects, features and advantages of the invention, will be apparent in the following detailed description of illustrative embodiments which is to be read in connection with the accompanying drawings.

FIGS. 1A and 1B are diagrams to which reference will be made in explaining the present invention;

FIG. 2 is a schematic block diagram showing a color video signal processing system according to an embodiment of this invention included in the reproducing section of a color VTR;

FIGS. 3 and 4 are schematic block diagrams respectively showing other embodiments of the invention; and FIG. 5 is a view similar to that of FIG. 2, but showing a color video signal processing system according to still another embodiment of this invention incorporated in the reproducing section of a color VTR which is adapted for recording and reproducing both PAL and NTSC color video signals.

DESCRIPTION OF PREFERRED EMBODIMENTS

Referring initially to FIG. 1A, it will be seen that the reference letter $S_c$ indicates the chrominance subcarrier of a color video signal, while the burst signal of the color video signal occurring during a vertical blanking or fly-back interval $t_v$ is indicated at $S_b$. In a color VTR for the magnetic recording and reproducing of color video signals, an automatic phase control or APC circuit is usually provided in the reproducing section for eliminating variations in the frequency or phase of the subcarrier $S_c$ of the chrominance component of the color video signal reproduced from a magnetic tape. In such APC circuit, the burst signal $S_b$ is extracted from the reproduced chrominance component and applied to a phase comparator where it is compared with a stable reference signal, for example, from a local oscillator, and the output or timing error voltage issuing from the comparator as a result of such comparison is then employed for controlling the frequency and/or phase of the chrominance subcarrier. As previously described, when a NTSC color video signal is being reproduced, the APC circuit is provided with a relatively high loop gain and, as a result thereof, the output or timing error voltage issuing from the comparator will exhibit a relatively high rising rate, that is, will rise steeply from the onset of the burst signal, so as to attain its eventual value within the vertical blanking interval $t_v$, as indicated by the line $E_n$ on FIG. 1B. However, when a PAL color video signal is being reproduced and the APC circuit is provided with a relatively low loop gain so as to afford the pull-in and hold ranges adapted to the PAL signal, the low loop gain of the APC circuit causes the output or timing error voltage from the comparator to have a relatively slow rising rate, that is, to rise relatively slowly from the commencement of the burst signal, with the result that the timing error voltage will still be rising at the initial portion of the subsequent vertical trace or scanning interval, as indicated by the broken line $E_p$ on FIG. 1B. Thus, correction of the frequency and/or phase of the chrominance subcarrier is not completed during the blanking interval and carries over into the beginning of the subsequent vertical trace or scanning period or interval and, by reason of the foregoing, hue aberrations appear at the upper portion of the color television picture produced from the reproduced PAL color video signal.

Generally, in accordance with the present invention, the foregoing problem in connection with the reproducing of PAL color video signals is avoided by providing the APC circuit with the necessary relatively low loop gain only during each vertical trace or scanning period, and by increasing the loop gain, for example, up to the level normally employed in connection with NTSC color video signals, during each vertical blanking period or interval.

Referring now to FIG. 2, it will be seen that the present invention is there shown applied to the reproducing section of a color VTR which may otherwise be of known construction for reproducing and also, if desired, recording, color video signals on a magnetic tape 1. The illustrated portion of the VTR is shown to have the usual rotary magnetic heads 2 associated with a guide drum (not shown) around which magnetic tape 1 is wrapped along a section of a helical path. As the tape 1 is moved longitudinally along such path, the heads 2 rotate so as to scan a series of parallel tracks on the tape, which tracks are disposed at an angle to the longitudinal direction of the tape.

Color television signals are generally divisible both in frequency and in time. In terms of frequency, they are divided into luminance signal components, which occupy the relatively low frequency portion of the complete color television signal band, and the chrominance signal components and burst signals, which occupy the relatively high frequency portions of the band. In terms of time, television signals are divided into field intervals, two of which make up a frame interval, and horizontal or line intervals. It is well known, for example, as disclosed in U.S. Pat. No. 3,580,980, issued May 25, 1971, and having a common assignee herewith, that, when recording color television or video signals, as aforesaid, it is preferable to separate the luminance and chrominance components prior to recording, whereupon, the luminance component is used to frequency or phase modulate an oscillator, and thus provide a frequency or phase modulated luminance signal, while the band of signals including the chrominance component and burst signals is frequency-converted to a lower frequency band, that is, the chrominance subcarrier has its frequency converted to a lower value. Then, the frequency or phase modulated luminance signal and the frequency-converted chrominance signal are combined to provide the composite color video signal which is actually recorded on the magnetic tape. During such recording of the composite color video signal on the tape, the rotational speed of rotary heads 2 and the speed of advancement of the tape 1 are selected so that, for example, one field of the composite color video signal is recorded in each of the oblique or skewed record tracks on the tape. When recording color video signals, as aforesaid, the converted chrominance subcarrier frequency is selected so as to have a particular relationship to the horizontal or line frequency of the color video signal being recorded, for example, as disclosed in detail in U.S. Pat. No. 3,730,983, issued May 1, 1973, and having a common assignee herewith. For example, when recording PAL color video signals having a chrominance subcarrier frequency of 4.43 MHz, the chrominance subcarrier may be frequency-converted to 685 KHz prior to the recording thereof.

Assuming that a PAL color video signal has been recorded on tape 1 as described above, it will be apparent that, during reproduction of such signal, heads 2 are rotated and tape 1 is longitudinally advanced so that the heads will successively scan and reproduce the fields of the video signal information recorded in the successive parallel tracks. As shown in FIG. 2, the reproduced color video signal is fed through an amplifier 3 to a high pass filter 4 which permits the passage therethrough of the frequency or phase modulated luminance component. Such frequency or phase modulated luminance component is passed through a limiter 5 to a demodulator 6 which provides, at its output, the original luminance component. The luminance component from demodulator 6 is supplied to a mixer or adder circuit 7 which has its output connected to an output terminal 8.

The amplified reproduced color video signal is also supplied from amplifier 3 to a low pass filter 11 which permits the passage therethrough of the chrominance component converted to the low frequency band. The thus separated chrominance component having a subcarrier frequency of, for example, 685 KHz, is supplied from filter 11 to a frequency converter 12 which also receives a frequency converting signal from an APC circuit 20, and by which the subcarrier of the chrominance component is frequency reconverted to the normal frequency for a PAL color video signal, that is, to 4.43 MHz. The frequency reconverted chrominance component is supplied from frequency converter 12 to the adder circuit 7 so that the latter adds such chrominance component to the luminance component from demodulator 6 to produce the reconstituted PAL color video signal which is delivered to output terminal 8.

In order to correct any angular errors, that is, time axis variations, that may occur in the chrominance subcarrier of the reproduced color video signal, for example, as may be caused by jitter during reproducing of the signal by rotary heads 2, the APC circuit 20 is shown to comprise a reference signal source 21, for example, in the form of a stable local oscillator, which produces a reference signal with the constant frequency of 4.43 MHz and supplies the same to a frequency converter 22. A voltage-controlled variable frequency oscillator 23 is also provided in circuit 20 and produces an oscillation output signal with a center frequency equal to the relatively low frequency to which the chrominance subcarrier has been converted for recording on tape 1, for example, with a center frequency of 685KHz. Such oscillating output signal from variable frequency oscillator 23 is also applied to frequency converter 22 so that the frequency converting signal applied from the output of frequency converter 22 to frequency converter 12 is equal to the sum of the frequencies of the signals applied to frequency converter 22 from local oscillator 21 and variable frequency oscillator 23, that is, has a center frequency of 5.12MHz in the example being described. In the frequency converter 12, the frequency (685KHz) of the chrominance subcarrier received from filter 11 beats down the frequency converting signal received from frequency converter 22 and having a center frequency of 5.12MHz in the example being described, so that the chrominance component supplied from frequency converter 12 to adder circuit 7 has its subcarrier reconverted to the desired frequency of 4.4MHz. Further, as shown, the chrominance component derived from frequency converter 12 is also applied to a burst gate circuit 24 which passes the burst signal $S_b$ (FIG. 1A) and supplies the same to a phase comparator 25. The phase comparator 25 is also supplied with the reference signal from local oscillator 21 and is effective to compare the phase of the burst signal $S_b$ from gate 24 with the phase of the stable reference signal. Based on such comparison, the comparator 25 provides a corresponding output or error voltage, for example, as at $E_p$ on FIG. 1B, which is applied to variable frequency oscillator 23 as the control voltage for the latter. Thus, the frequency of the oscillating output of variable frequency oscillator 23, as applied to frequency converter 22, is controlled in accordance with the output or error voltage from comparator 25 so that, even if the chrominance subcarrier of the reproduced color video signal, as applied through filter 11 to frequency converter 12, undergoes fluctuations or variations in its frequency and/or phase, the frequency and/or phase of the frequency converting signal applied from frequency converter 22 to frequency converter 12 is correspondingly varied for ensuring that the frequency and phase of the chrominance subcarrier in the output from frequency converter 12 will be constant.

As generaly described above, in accordance with the present invention, when the signal being reproduced as a PAL color video signal, the APC circuit 20 is provided with the requisite relatively low loop gain during each vertical trace or scanning period, and the loop gain is increased, for example, up to the level normally employed in connection with the reproduction of NTSC color video signals, only during each vertical blanking period or interval. In order to achieve the foregoing in the embodiment of the invention shown on FIG. 2, the reference signal from local oscillator 21 is applied to the respective input of comparator 25 by way of a switching circuit 31 having a movable contact 31a connected to local oscillator 21 for receiving the reference signal therefrom, and being alternately engaged with fixed contacts 31b and 31c. The contact 31b is directly connected to the respective input of comparator 25, while the contact 31c of switching circuit 31 is connected to such input of the comparator through a level attenuator 32. It will be apparent that, when switching circuit 31 is in the condition shown on FIG.

2, the reference signal is applied to comparator 25 through attenuator 32 and thus has its level reduced to correspondingly reduce the loop gain of APC circuit 20. However, when switching circuit 31 is changed-over to engage its movable contact 31a with fixed contact 31b, the reference signal from local oscillator 21 is applied directly to comparator 25 for providing APC circuit 20 with a relatively high loop gain.

In order to control the operation of switching circuit 31, the output of adder circuit 7, that is, the reconstituted color video signal, is applied to a separator circuit 33 which is operative to extract the vertical synchronizing signal from the reconstituted color video signal and to supply the separated vertical synchronizing signal to a waveform shaping circuit 34. The output of shaping circuit 34 is applied, as a switching signal, to switching circuit 31 so that the latter is disposed in the condition shown on FIG. 2 during the vertical trace or scanning interval of the color video signal, and is changed over to engage its movable contact 31a with fixed contact 31b during each vertical blanking period $t_v$ (FIG. 1A). Accordingly, with the embodiment of the invention shown on FIG. 2, during each vertical blanking interval or period $t_v$, the reference signal from local oscillator 21 is supplied directly, that is, with a relatively high level, to the comparator 25 in order to ensure that the control or error voltage applied from comparator 25 to variable frequency oscillator 23 in response to a deviation of the sampled burst signal from the reference signal will rise steeply during the vertical blanking period and thereby provide APC circuit 20 with the desired relatively high loop gain. On the other hand, during each vertical trace or scanning period, switching circuit 31 is effective to apply the reference signal from local oscillator 21 to comparator 25 by way of attenuator 32 so that the level of the reference signal is reduced and the loop gain of APC circuit 20 is correspondingly decreased. Since the loop gain is increased during each vertical blanking period $t_v$, the appearance of hue aberrations at the upper portion of the reproduced color television picture is avoided. Further, since the loop gain of APC circuit is decreased during each vertical trace or scanning period, the chrominance subcarrier of the PAL color video signal will not be mis-locked to an erroneous frequency. It will also be seen that the foregoing advantageous characteristics in reproducing PAL color video signals are attained with a circuit arrangement that is relatively simple and inexpensive.

In the embodiment of this invention described above with reference to FIG. 2, the loop gain of APC circuit 20 is changed in an abrupt manner by the actuation of switching circuit 31 at the beginning and end of each vertical blanking period or interval. However, if desired, the attenuation of the reference signal supplied from local oscillator 21 to comparator 25 may be more gradually changed at the beginning and end of each vertical blanking period. More specifically, as shown on FIG. 3, in which the several circuit components corresponding to those described above with reference to FIG. 2 are identified by the same reference numerals, an APC circuit 20a of a color video signal processing system according to this invention may include a variable attenuating circuit 32a through which the reference signal is applied from local oscillator 21 to the respective input of phase comparator 25. In such APC circuit 20a, vertical synchronizing signals are separated from the reconstituted color video signal by the synchronizing separating circuit 33a and applied to a waveform shaping circuit 34a which, at its output, provides a control signal for variable attenuating circuit 32a so that the latter effects substantial attenuation of the reference signal from oscillator 21 during each vertical trace or scanning period, while the reference signal is passed through circuit 32a, with little or no attenuation, during each vertical blanking period. Thus, the circuit arrangement of FIG. 3 once again provides APC circuit 20a with a relatively large loop gain during each vertical blanking period, and with a reduced loop gain during each vertical trace or scanning period so as to ensure that the chrominance subcarrier of the reproduced PAL color video signal will not be mis-locked to an erroneous frequency, and that hue aberrations in the upper portion of the reproduced color television picture will be avoided.

In each of the embodiments of this invention described above with reference to FIGS. 2 and 3, respectively, the loop gain of the APC circuit 20 or 20a has been changed by correspondingly varying the level of the reference signal applied from local oscillator 21 to phase comparator 25. However, the loop gain of the APC circuit may be otherwise varied. For example, as shown on FIG. 4, in which the circuit components corresponding to those previously described with reference to FIG. 2 are again identified by the same reference numerals, the reference signal from local oscillator 21 is applied directly to the respective input of phase comparator 25 both during the vertical scanning and vertical blanking periods, and the change in the loop gain of APC circuit 20b is effected by suitably varying a bias voltage of the variable frequency oscillator 23b. More specifically, in APC circuit 20b, the vertical synchronizing signals separated from the reconstituted PAL color video signal by a separating circuit 33b are applied to a waveform shaping circuit 34b, and the output of the latter is applied to variable frequency oscillator 23b for controlling a bias voltage of the latter so that APC circuit 20b once again exhibits a relatively high loop gain during each vertical blanking period and a relatively lower loop gain during each vertical scanning period.

Although the invention has been described above as being applied to the reproducing section of a color VTR adapted for recording and reproducing PAL color video signals, it is to be noted that the invention is also applicable to color VTRs which are adapted to record and reproduce both NTSC and PAL color video signals. For example, as shown on FIG. 5, the present invention may be applied to the reproducing section of a color VTR of the type disclosed in U.S. Pat. No. 3,845,237, issued Oct. 29, 1974, and having a common assignee herewith, and which is adapted for recording and reproducing both NTSC and PAL color video signals. In the recording section of such color VTR, the chrominance sub-carrier frequency of the received signal is converted to a first predetermined frequency, for example, of 767KHz, which is the same for recording either NTSC or PAL color video signals. When reproducing such recorded NTSC or PAL color video signals, the chrominance subcarrier frequency of the reproduced chrominance component is reconverted to a second predetermined frequency, for example, the chrominance subcarrier frequency of 4.43MHz which is standard for PAL signals. Thereafter, the demodulated luminance component and the frequency reconverted chrominance component of the reproduced color video signals are combined to provide a composite signal which can be displayed by a single monitor whether the original video signals were NTSC or PAL color video signals. Thus, for example, in the circuit arrangement of FIG. 5 which is generally similar to that described above with reference to FIG. 2 and which has its corresponding circuit components identified by the same reference numerals, the NTSC or PAL color video signals recorded on tape 1 with the chrominance subcarrier converted to a frequency of 767KHz, irrespective of the type of the original signals, are reproduced by rotary heads 2, with the reproduced signals being amplified in amplifier 3. The frequency or phase modulated luminance component of the reproduced signal is passed from amplifier 3 through high pass filter 4 and limiter 5 to demodulator 6, and the resulting demodulated luminance component is then applied to adder circuit 7. The chrominance component of the reproduced signal is separated from the output of amplifier 3 by low pass filter 11 and applied to frequency converter 12 by which the frequency of the chrominance subcarrier is converted to 4.43MHz by a frequency converting signal obtained from frequency converter 22 of APC circuit 20c. As in the previously described embodiments, the output of frequency converter 12 is applied to adder circuit 7 for combining, in the latter, with the luminance signal from demodulator 6 to provide a composite color video signal which is supplied to output terminal 8.

In the case where the NTSC and PAL color video signals are recorded on tape 1 with the chrominance subcarrier thereof converted to a frequency of 767KHz, as described above, the variable frequency oscillator 23 of APC circuit 20c is provided with a center frequency of 767KHz, while the local oscillator 21 provides the reference signal with a frequency, for example, of 4.43MHz, which is equal to the frequency to which the chrominance subcarrier is to be reconverted in frequency converter 12.

It will be seen that the APC circuit 20c of FIG. 5 includes, in addition to the circuit components thereof corresponding to those in the APC circuit 20 of FIG. 2, a detecting circuit 35 which receives the composite color video signal from adder circuit 7, and which detects, for example, on the basis of the horizontal or line frequency of that composite signal, when the latter originated as a NTSC color video signal. When detecting circuit 35 detects that the signal being reproduced originated as a NTSC color video signal, the resulting output from circuit 35 causes a switch control circuit 36 to provide a control signal applied to switching circuit 31 for maintaining the latter in the condition where its movable contact 31a is continuously engaged with the fixed contact 31b.

From the above, it will be apparent that, when the signal being reproduced by the circuit arrangement of FIG. 5 originated as a NTSC color video signal, the reference signal from local oscillator 21 is continuously applied directly to the respective input of phase comparator 25 so as to provide APC circuit 20c with the desired relatively high loop gain during each vertical trace or scanning period as well as during each vertical blanking period. However, when the signal being reproduced originated as a PAL color video signal, the absence of any output from the NTSC signal detecting circuit 35 permits switching circuit 31 to be actuated by the vertical synchronizing signal separating circuit 33 and waveform shaping circuit 34, as previously described with reference to the embodiment of the invention shown on FIG. 2. Thus, when the reproduced signal originated as a PAL color video signal, APC circuit 20c has a relatively high loop gain during each vertical blanking period to prevent hue aberrations in the upper portion of the reproduced color television picture, while a relatively low loop gain is provided for the APC circuit during each vertical trace or scanning period so as to prevent mislocking of the chrominance subcarrier to an erroneous frequency.

Although illustrative embodiments of the invention have been described above with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A color video signal processing system for correcting effects of angular errors in the subcarrier of the chrominance component of a color video signal, comprising:
A. frequency converting means receiving said chrominance component of the color video signal for frequency converting the chrominance subcarrier by means of a frequency converting signal applied to said frequency converting means; and
B. an automatic phase control loop circuit comprising:
 1. a reference signal source for producing a reference signal,
 2. a phase comparator for phase comparing the chrominance subcarrier with said reference signal and providing a control voltage in response to a deviation of said chrominance subcarrier from said reference signal,
 3. means for producing said frequency converting signal including a variable frequency oscillator having its output phase controlled by said control voltge from said phase comparator, and
 4. means for changing the gain of said loop circuit to one value for the vertical blanking interval and a different value for the vertical trace interval, respectively, of said color video signal.

2. A color video signal processing system according to claim 1; in which the gain of said loop circuit is increased for each said vertical blanking interval as compared with said gain for each said vertical trace interval.

3. A color video signal processing system according to claim 1; in which said means for changing the gain of said loop circuit includes means for relatively greatly attenuating the level of said reference signal applied to said comparator during each said vertical trace interval and for reducing the level attenuation of said reference signal applied to said comparator during each said vertical blanking interval.

4. A color video signal processing system according to claim 1; in which said means for changing the gain of said loop circuit includes level attenuating means, switch means having a first condition for applying said reference signal directly to said comparator and a second condition for applying said reference signal to said comparator through said attenuating means, means for separating a vertical synchronizing signal from the color video signal, and means for controlling said switch means in dependence on the separated vertical synchronizing signal so as to dispose said switch means in said first condition during each said vertical blanking interval and in said second condition during each said vertical trace interval.

5. A color video signal processing system according to claim 1; in which said means for changing the gain of said loop circuit includes variable level attenuating means through which said reference signal is applied from said reference signal source to said comparator, means for separating a vertical synchronizing signal from the color video signal, and means for controlling said level attenuating means in response to the separated vertical synchronizing signal so as to cause relatively great attenuation of the level of said reference signal applied to said comparator during each said vertical trace interval and reduced attenuation of said level of the reference signal applied to said comparator during each said vertical blanking interval.

6. A color video signal processing system according to claim 1; in which said means for changing the gain of said loop circuit includes means for separating a vertical synchronizing signal from the color video signal, and means for varying a bias voltage for said variable frequency oscillator in dependence on the separated vertical synchronizing signal so that the gain of said output of the variable frequency oscillator is increased for each said vertical blanking interval as compared with said gain for each said vertical trace interval.

7. A color video signal processing system according to claim 1; in which said color video signal is a PAL color television signal.

8. A color video signal processing system according to claim 1; in which said chrominance component, as received by said frequency converting means, has a frequency band substantially lower than a normal frequency band therefor, and said frequency converting signal is effective, in said frequency converting means, to restore said chrominance component from said lower frequency band to said normal frequency band.

9. A color video signal processing system according to claim 8; in which said color video signal is selectively a PAL color television signal and an NTSC color television signal; and further comprising means for deactivating said means for changing the gain of said output of the variable frequency oscillator when said color video signal is an NTSC color television signal.

* * * * *